United States Patent [19]

Nagatomo et al.

[11] Patent Number: 4,593,609
[45] Date of Patent: Jun. 10, 1986

[54] AUTOMOBILE VENTILATOR

[75] Inventors: Hideaki Nagatomo; Mitsuo Yasuda, both of Shizuoka, Japan

[73] Assignee: Mitsubishi Denki Kabushiki Kaisha, Tokyo, Japan

[21] Appl. No.: 772,788

[22] Filed: Sep. 5, 1985

[30] Foreign Application Priority Data

Sep. 6, 1984 [JP] Japan .................. 59-135470[U]

[51] Int. Cl.$^4$ ............................................. B60H 3/06
[52] U.S. Cl. ..................................... 98/2.01; 98/2.11
[58] Field of Search ........................... 98/2, 2.01, 2.11

[56] References Cited

FOREIGN PATENT DOCUMENTS

| 53-140731 | 12/1978 | Japan . | |
|---|---|---|---|
| 54-49729 | 4/1979 | Japan . | |
| 119521 | 9/1980 | Japan | 98/2.11 |
| 136510 | 8/1983 | Japan | 98/2.11 |
| 134005 | 8/1984 | Japan | 98/2.01 |

Primary Examiner—Harold Joyce

Attorney, Agent, or Firm—Armstrong, Nikaido, Marmelstein & Kubovcik

[57] ABSTRACT

An automobile ventilator which is a conventional ventilating device and a conventional air cleaning device combined into one. The ventilator structure has an air blowing passage opening into a passenger room of the vehicle. Through the air blowing passage comes out air blown by an impeller provided at the passage. There are further two passages to guide air to the impeller; one is a ventilation passage communicating outside the vehicle body while the other is a circulation passage opening into the passenger room. A damper is provided between the two passages in hinge fashion to selectively close either one of the two passages. This damper is controlled by manipulating the ignition switch such that the ventilation passage is closed on engine start whereas the circulation passage is closed when the engine is stopped. The impeller is driven alternately by first and second drive circuits. The first drive circuit is placed in an operative condition when the ignition switch is thrown to ON position whereas the second drive circuit is placed in an operative condition when the ignition switch is thrown to OFF position.

5 Claims, 5 Drawing Figures

Prior art

AUTOMOBILE VENTILATOR

BACKGROUND OF THE INVENTION

The present invention relates to an automobile ventilator equipped with an air cleaning unit and for introducing the outside air into the passenger room of a vehicle to suppress the rise of the temperature of the passenger room of the vehicle exposed to a high heat load such as the scorching heat of the sun, and more specifically to a control mechanism of such an automobile ventilator for controlling a damper for changing the air passage for ventilating operation in which the outside air is introduced into the passenger room, or for air-cleaning operation in which the air in the passenger room is cleaned.

FIG. 4 shows an automobile ventilator disclosed in Japanese Provisional Patent Publication No. 53-140731, and FIG. 5 shows an automobile air cleaning device disclosed in Japanese Utility Model Publication No. 56-39554. Referring to FIG. 4, indicated at 1a is an impeller for sucking outside air into the passenger room, at 2 is a motor for driving the impeller, at 3 is a fan casing, at 4 is a duct connecting the interior of the fan casing to an outside-air inlet 5 opening into the outside of the passenger room and at 6a is an air outlet formed in the fan casing to blow air into the passenger room. When the temperature in the passenger room rises due to a high heat load, for example, due to exposure to the scorching heat of the sun during parking, the impeller 1a is rotated to suck the outside air into the fan casing 3 through the outside-air inlet 5 and the duct 4, and then the outside air is blown through the air outlet 6a into the passenger room.

The introduction of the outside air into the passenger room by such a ventilator controls the passenger room temperature, which may possibly rise up to 60° C. to 70° C. when the vehicle is exposed to the scorching heat of the sun in the middle of summer during parking, at a temperature slightly higher than the ambient temperature.

On the other hand, in FIG. 5, indicated at 1b is an impeller for circulating the inside air of the passenger room, at 10 is a fan casing, at 11 is an air cleaning device provided within the fan casing, at 12 is an inside-air inlet, and at 6b is an air outlet for blowing air into the passenger room therethrough. Unclean passenger room air is sucked through the inside-air inlet into the fan casing 10 by the action of the impeller 1b, then the air is cleaned by the built-in air cleaning device 11, and then the clean air is blown through the air outlet into the passenger room. Thus, according to conventional practice, a vehicle is provided with two individual blowers

SUMMARY OF THE INVENTION

Accordingly, it is an object of the present invention to provide an automobile ventilator having a single blower and capable of selectively performing the ventilation of the passenger room of a vehicle or the cleaning of the passenger room air depending on the condition of the engine of the vehicle, namely, whether the engine is stopping or whether the engine is operating.

When the natures of the above-mentioned conventional ventilator and the air cleaning device are considered, the former is used when the vehicle is parked with the engine being stopped, whereas the latter is used when the vehicle is running and the engine is operating. Since most vehicles are provided with blowers for taking outside air, there is the least necessity for using a ventilator for taking outside air into the passenger room while the vehicle is running. On the basis of such a conception, the present invention combines a ventilator and an air cleaning device, which according to the conventional practice are disposed separately, into an automobile ventilator having a single impeller and a single motor for driving the impeller which are used for both ventilation and air cleaning. According to the present invention, a single damper is operated depending on whether the engine is operating or being stopped, to change the air passage for ventilation or for air cleaning.

According to the present invention, a ventilating air passage to take outside air into the passenger room for ventilation is opened and an air circulating passage for air cleaning is closed while the engine is stopped. On the contrary, the ventilating air passage is closed by locking a damper at a closing position for air cleaning while the engine is operating and the vehicle is running.

DESCRIPTION OF THE PREFERRED EMBODIMENTS

Figure 1:
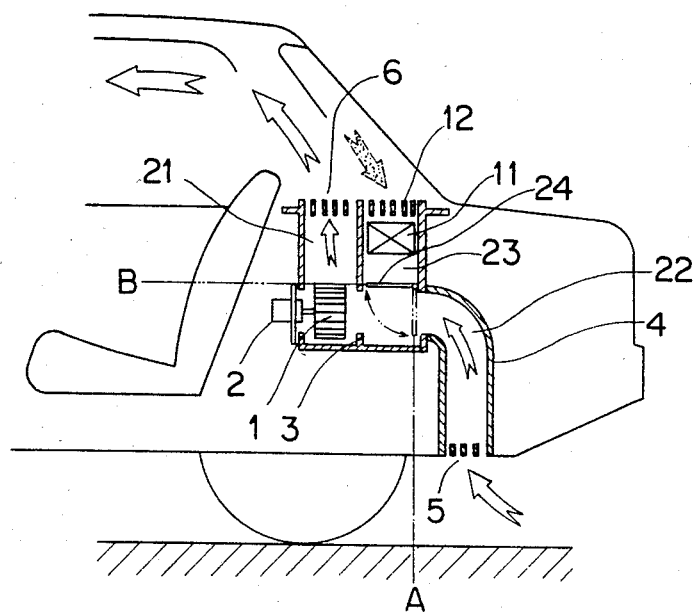
FIG. 1 is a schematic illustration of an automobile ventilator according to the present invention as mounted on an automobile for assistance in explaining the basic conception of the automobile ventilator capable of functioning for passenger room air cleaning and for forced ventilation of the passenger room.

Referring to FIG. 1 showing the basic constitution of an automobile ventilator of the present invention, indicated at 21 is an air blowing passage for blowing the air blown by an impeller 1 provided in a fan casing 3 into the passenger room, at 22 is a ventilating passage for sucking outside air into the fan casing 3, at 23 is a circulation passage formed in the fan casing 3 to circulate the passenger room air for cleaning, and at 24 is a changeover damper for changing between the ventilating passage and the circulation passage. As seen in FIG. 1, the air blowing passage is in communication with the passenger room and form a first passage section. The ventilation passage 22 is in communication outside the vehicle body whereas the circulation passage 23 is in communication with the passenger room. Said two passages 22 and 23 form a second passage section which communicates the first passage section. Said impeller 1 is provided between the first passage section and the second passage section. Further, the damper 24 is provided between the impeller 24 and the second passage section.

In a ventilation mode for ventilating the passenger room, the changeover damper 24 is positioned at a position B indicated by two-dot chain line in FIG. 1 so that the ventilating passage 22 for sucking the outside air is opened and the circulation passage 23 for cleaning the passenger room air is closed. Accordingly, when the impeller 1 is driven by the motor 2 for rotation, the outside air is sucked through an outside-air inlet 5 and a duct 4 into the fan casing 3, and then the outside air is blown into the passenger room through the air blowing passage 21 and an air outlet 6. In an air cleaning mode, the changeover damper 24 is positioned at a position A indicated by one-dot chain line in FIG. 1 so that the circulation passage 23 for cleaning the passenger room air is opened and the ventilating passage 22 for sucking outside air is closed. Therefore, when the impeller 1 is driven for rotation, the unclean passenger room air is sucked from the passenger room to be circulated through a passenger room air inlet 12, an air cleaning device 11 disposed in the ventilating passage 23 and the blowing passage 21 such that the clean air is blown into the passenger room. The unclean passenger room air is cleaned and deodorized as it passes through the air cleaning device 11 such as an electrostatic filter.

If the vehicle runs with the changeover damper 24 positioned inadvertently at the position B as indicated by the two-dot chain line in FIG. 1, dirty outside air containing dust kicked up by the tires enter the passenger room since the blowing passage 21 communicates with the ventilating passage 22 for sucking the outside air.

Figure 2:
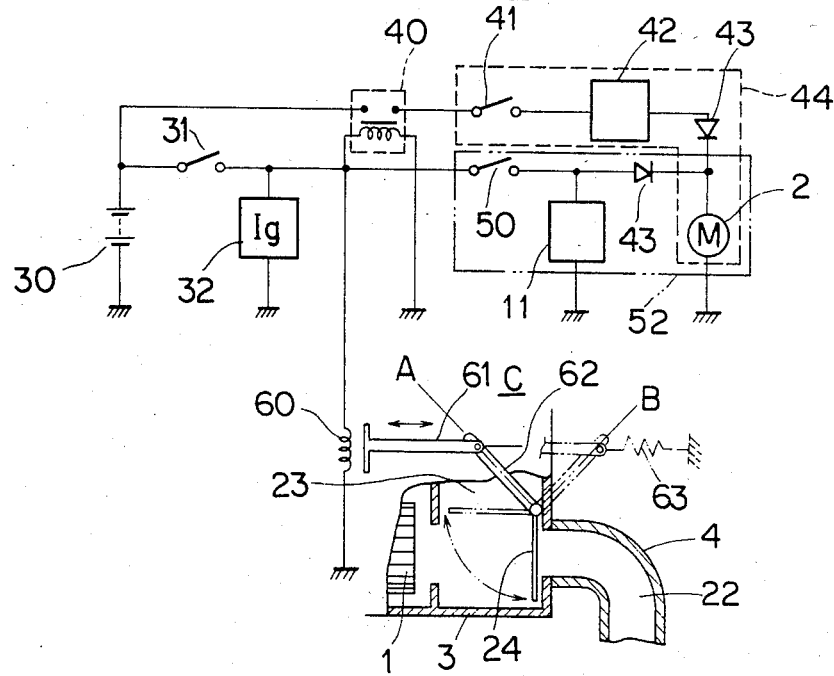
FIGS. 2 and 3 are schematic illustrations of preferred embodiments of the present invention.

The automobile ventilator of the present invention is contrived to obviate such a careless operation. Briefly, the changeover damper is always positioned so as to keep the ventilating passage open regardless of the position of the main switch of the ventilating unit when the ignition switch is thrown to OFF-position or when the engine is stopped, whereas the changeover damper is always positioned and locked in place so as to open the circulation passage and to close the ventilating passage so that ventilation is stopped regardless of the position of the main switch of the air cleaning device when the ignition switch is thrown to ON-position or when the start of the engine is detected. Thus the present invention achieves both passenger room air cleaning operation at desired time and the obviation of the entrance of the contaminated outside air into the passenger room. The invention will be described more concretely with reference to FIG. 2 showing a contrivance for the above-mentioned mode of operation. In FIG. 2, there are shown a power source 30 of the vehicle, an ignition switch 31, an ignition system 32, a normally closed interlocking relay 40, a ventilating unit main switch 41, a ventilating unit control circuit 42, a diode 43, a ventilating system 44, an air cleaning device main switch 50, an air cleaning system 52, a solenoid 60, a first damper driving arm 61 adapted to be controlled by the solenoid, a second damper driving arm 62 connected to the changeover damper 24 and linked with the first damper driving arm 61 so as to turn the changeover damper 24, and an extension spring 63 acting on the first and second damper driving arms. The solenoid 60, the first and second damper driving arms 61 and 62 and the extension spring 63 constitute a damper locking device C for locking the changeover damper 24. In this way, the power source 30, the ignition switch 31 and the solenoid 60 form a damper drive circuit. On the hand, the power source 30, the ignition switch 31, the air cleaning device main switch 50, the diode 43 and the motor 2 form a first impeller drive circuit whereas the power source 30, the normally closed interlocking relay 40, the ventilating unit main switch 41, the ventilating unit control circuit 42, the diode 43 and the motor 2 form a second impeller drive circuit which is parallel to the first impeller drive circuit. When the ignition switch 31 is thrown to OFF-position, the coil of the relay 40 and the solenoid 60 are not energized. Therefore, the ventilating system 44 can be operated and the extension spring 63 turns the second damper driving arm 62 to position the changeover damper 24 at the position B as indicated by in two-dot chain line in FIG. 1. Thus, a ventilation mode, in which the ventilating passage 22 is open and the circulation passage 23 is closed by the changeover damper 24, is established. On the contrary, when the ignition switch 31 is thrown to ON-position, the coil of the relay 40 and the solenoid 60 are energized to open the circuit. Therefore, the ventilating system 44 is unable to operate even if the ventilating unit main switch 41 is closed, and the first damper driving arm 61 is attracted by the solenoid 60 so that the second damper driving arm 62 is turned to bring the changeover damper 24 to the position A indicated by one-dot chain line in FIG. 1, where the changeover damper is locked, regardless of the position of the air cleaning device main switch 50. Consequently, the changeover damper 24 is locked at a position where the ventilating passage 22 for sucking outside air is closed while the circulation passage for cleaning the passenger room air is open. Thus an air cleaning mode is established.

Figure 3:
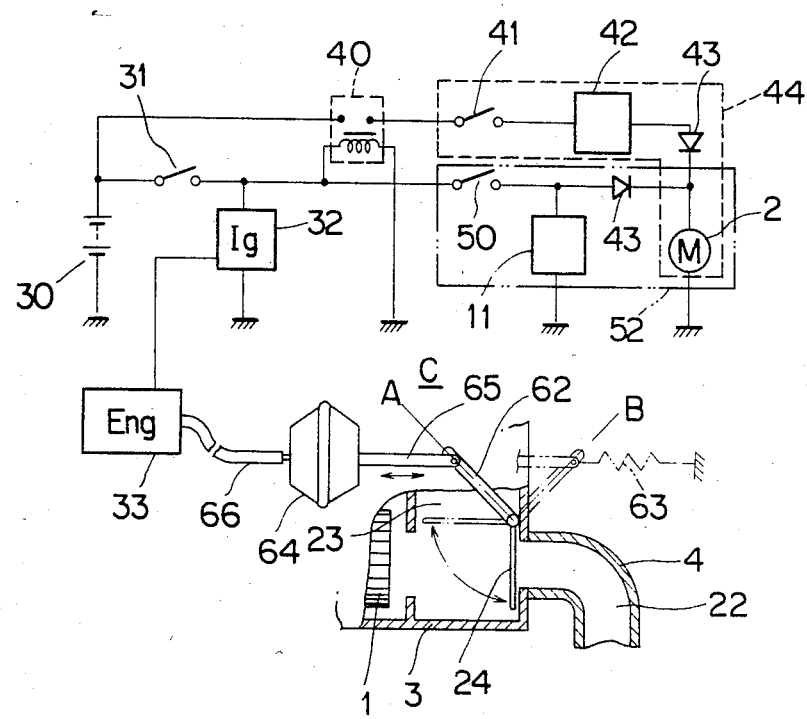
Figure 4:
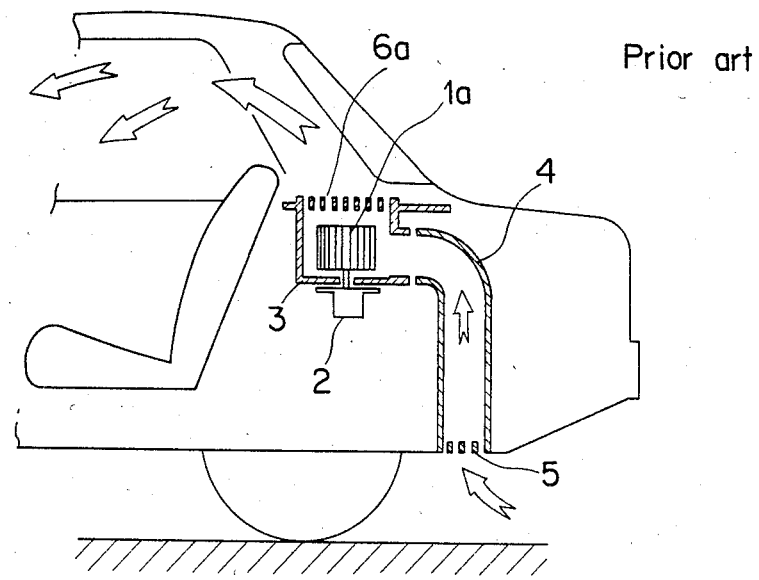
FIG. 4 is a schematic fragmentary sectional view of a conventional automobile ventilator.
Figure 5:
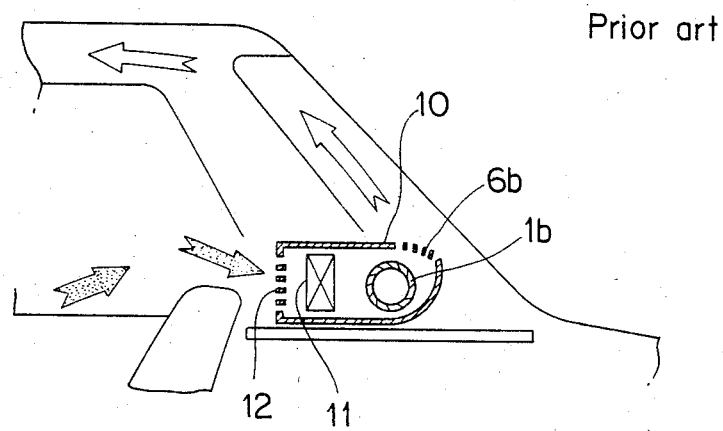
FIG. 5 is a schematic fragmentary sectional view of a conventional automobile air cleaner.

FIG. 3 shows a second embodiment of the present invention. In FIG. 3, there are shown the engine 33 of the vehicle, an actuator 64, a damper driving arm 65 adapted to be driven by the actuator 64 when a negative pressure is applied to the actuator 64, and a negative pressure tube 66. Like reference characters designate like or coresponding parts through FIGS. 2 and 3. In the second embodiments, an extension spring 63 turns a damper driving arm 62 to a position B indicated by two-dot chain line in FIG. 3 when the engine 33 is stopped, and thereby a changeover damper 24 opens a ventilating passage for sucking the outside air. When the ignition switch 31 is thrown to ON-position and the engine 33 is started under the control of the ignition system 32, a negative pressure produced by the operation of the engine 33, namely, an intake manifold pressure, is applied through the negative pressure tube 66 to the actuator 64 to move the second damper driving arm 62 through the damper driving arm 65 to a position A indicated by continuous line in FIG. 3. Thus the changeover damper 24 is locked at a position, where only the circulation passage 23 is open.

Although the first embodiment of FIG. 2 employs the solenoid 60 as the power source of the damper locking device C a motor provided with a detector for detecting the position of the ignition switch may be employed instead of the solenoid 60.

As apparent from what has been described hereinbefore, the automobile ventilator of the present invention is not only capable of achieving cleaning of the passenger room air and the forced ventilation of the passenger room by means of a single changeover damper through a predetermined damper position changing operation, but also capable of surely obviating the entrance of the exhaust gas, dirty air containing dust into the passenger room during running by selectively positioning the changeover damper in connection with the operation of the ignition switch. Furthermore, the automobile ventilator of the present invention requires only a single blower for multiple purposes.

As many widely different embodiments of this invention may be made without departing from the spirit and scope thereof, it is to be understood that the invention is not limited to the specific embodiments thereof as described herein except as defined in the appended claims.

What is claimed is:

1. An automobile ventilator comprising a first passage section formed within a vehicle body, said first passage section including an air blowing passage in communication with a passenger room;

a second passage section formed within the vehicle body and in communication with said first passage section, said second passage section having a ventilating passage in communication outside the vehicle body and a circulation passage in communication with the passenger room and having an air cleaning device therein;

an impeller provided between said first passage section and said second passage section to blow air into the passenger room through said air blowing passage;

damper means provided between said impeller and said second passage section, said damper means being adapted to selectively close either one of the ventilation passage and the circulation passage;

a damper drive circuit having therein a power source, damper drive means and an ignition switch between the power source and the damper drive means, said damper drive circuit being adapted to actuate the damper drive means when said ignition switch is thrown to ON position such that the damper closes the ventilation passage and when said ignition switch is thrown to OFF position such that the damper closes the circulation passage;

a first impeller drive circuit branched off from the damper drive circuit to drive the impeller, said first impeller drive circuit having a cleaning device switch therein;

a second impeller drive circuit provided parallel to said first impeller drive circuit to drive the impeller, said second impeller drive circuit having a ventilation unit switch therein;

switch means provided in said second impeller drive circuit, said switch means being interlocked with said ignition switch to perform ON and OFF operations opposite to the ignition switch.

2. An automobile ventilator according to claim 1, wherein said damper drive means includes a solenoid, said damper being connected to a link mechanism adapted to be normally maintained away from said solenoid to close the circulation passage and attracted thereto on energization of the solenoid to close the ventilation passage.

3. An automobile ventilator according to claim 1, wherein said damper drive means includes an engine, a negative pressure tube connected to said engine, an actuator to operate according to negative pressure, said damper being connected to a link mechanism connected to said actuator adapted to be normally pulled away from the actuator to close the circulation passage and be attracted by the actuator theretoward upon engine start to close the ventilation passage.

4. An automobile ventilator according to claim 1, wherein said switch means includes a normally-closed interlocking relay adapted to be opened when the ignition switch is thrown to ON-position.

5. An automobile ventilator according to claim 1, wherein said air cleaning device includes an electrostatic filter therein.

* * * * *